United States Patent [19]
Faraj

[11] Patent Number: 5,676,045
[45] Date of Patent: Oct. 14, 1997

[54] OUTDOOR GRILL

[76] Inventor: Abdul-Razzak Faraj, P.O. Box 566068, Atlanta, Ga. 31156

[21] Appl. No.: 767,945

[22] Filed: Dec. 17, 1996

[51] Int. Cl.⁶ .............................. A47J 37/00; A47J 37/04
[52] U.S. Cl. .................... 99/339; 99/341; 99/390; 99/394; 99/400; 99/446; 99/450; 99/482; 126/25 R; 126/25 A; 126/9 R
[58] Field of Search .................. 99/339, 340, 341, 99/385, 389–391, 394–399, 400, 401, 444–450, 481, 482; 126/9 R, 9 A, 9 B, 25 R, 25 A, 41 R, 30

[56] References Cited

U.S. PATENT DOCUMENTS

| | | | |
|---|---|---|---|
| 4,095,516 | 6/1978 | Orsing | 99/390 |
| 4,317,441 | 3/1982 | Berg | 126/41 R |
| 4,438,684 | 3/1984 | Geissmann | 99/341 |
| 4,590,848 | 5/1986 | Willingham | 99/339 |
| 4,598,693 | 7/1986 | Koziol | 126/41 R |
| 4,663,517 | 5/1987 | Huff, et al. | 99/393 X |
| 4,781,170 | 11/1988 | Perl | 99/401 X |
| 5,048,882 | 9/1991 | Fielding et al. | 99/394 |
| 5,213,027 | 5/1993 | Tsotsos et al. | 126/25 A |
| 5,377,582 | 1/1995 | Nersesian | 99/448 X |
| 5,558,009 | 9/1996 | Fabrikant et al. | 99/450 |
| 5,568,764 | 10/1996 | Belongia et al. | 99/341 |

*Primary Examiner*—Timothy F. Simone
*Attorney, Agent, or Firm*—John L. James

[57] ABSTRACT

An outdoor grill has a firebox positioned in a corner at the intersection of the sidewall and bottom of the grill. The firebox has a heat directing surface oriented at an angle to match the angle of the cooking rack which has a handle extending through the sidewall to position the cooking area of the cooking rack over the firebox. Supports are mounted on the bottom for adjusting the cooking rack to vary distance between the cooking area of the rack and the heat directing surface of the firebox. A second firebox with a vertically oriented heat directing surface heats one side of the rack while the first firebox heats the other side.

20 Claims, 3 Drawing Sheets

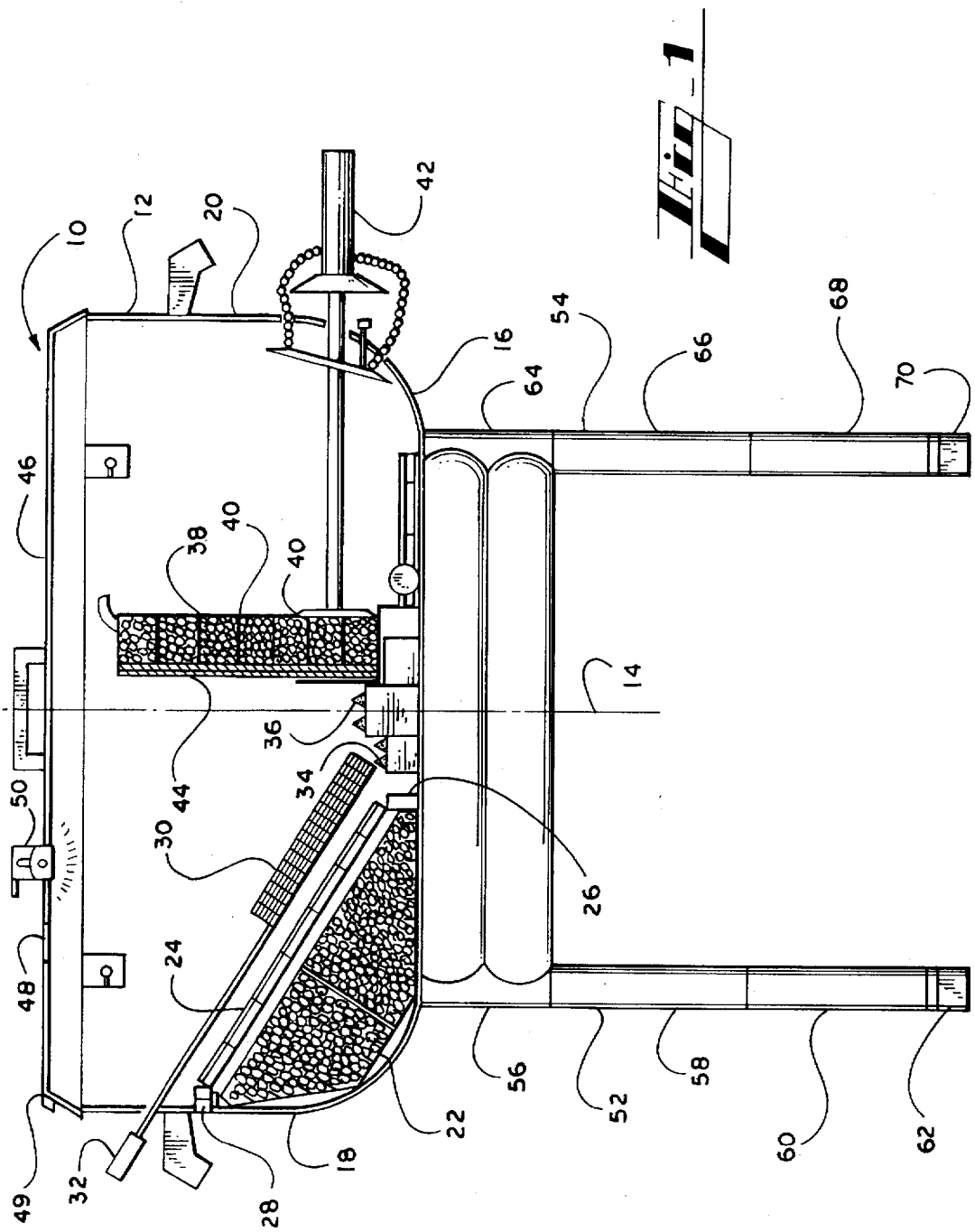

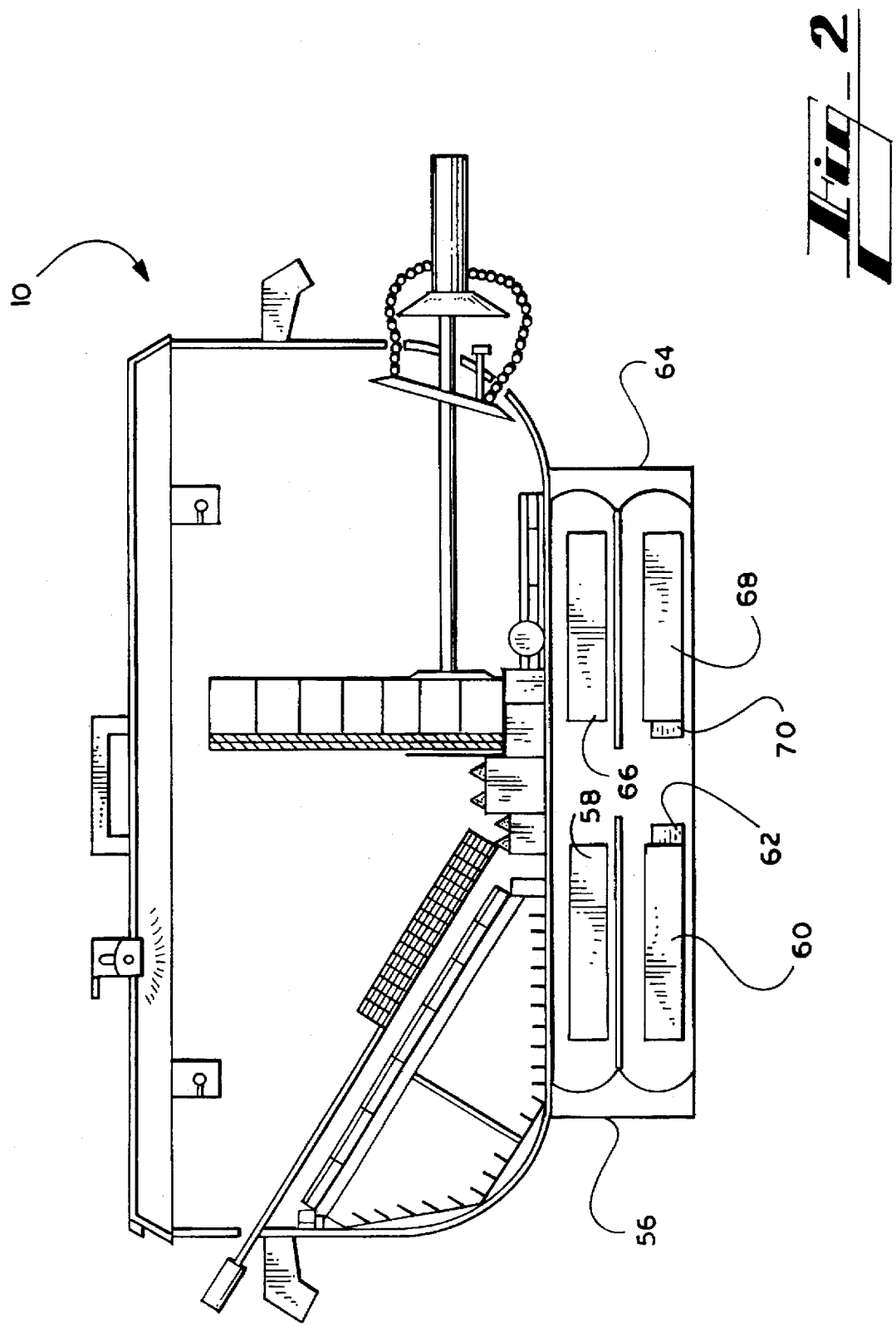

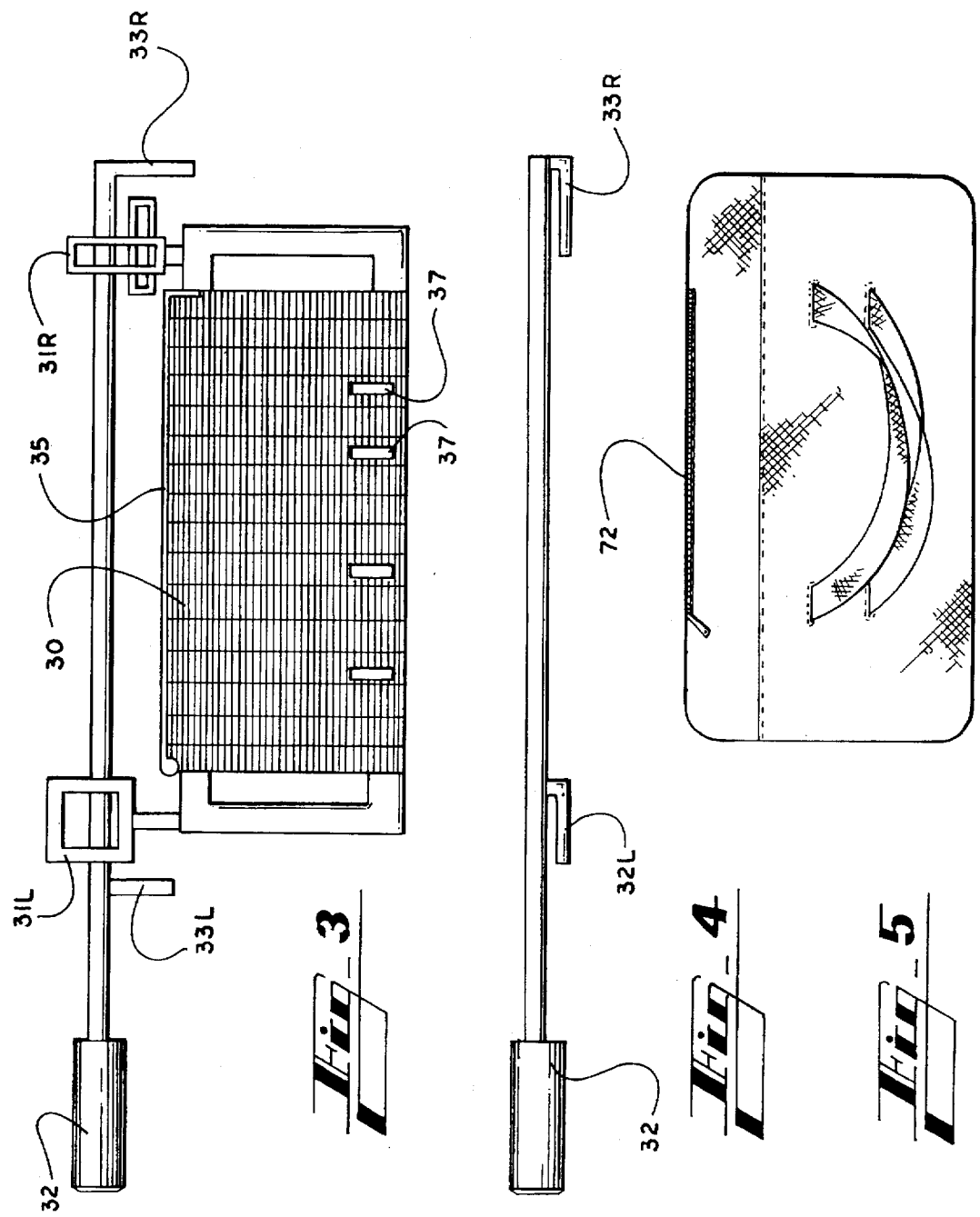

OUTDOOR GRILL

FIELD OF THE INVENTION

The present invention relates generally to barbecue grills and, more particularly, to grills for outdoor use.

BACKGROUND OF THE INVENTION

Conventional outdoor grills have a cooking rack suspended over a firebox. When food is placed on the rack for cooking, one side of the food is cooked and the food turned to cook the other side. This process ensures thorough cooking but is not well suited for someone in a hurry. Some grills have adjustable racks wherein the distance between the fire and rack is variable to cook food at a faster or slower pace, but only one side of the food cooks at a time. Accordingly, it will be appreciated that it would be highly desirable to have a grill that cooks both sides of the food simultaneously and thereby reduce cooking time.

To speed cooking time, some grills have a covering lid to trap heat similar to a household oven. Unfortunately, heat escapes slowing cooking time when the lid is opened or removed to observe cooking progress. It is desirable to have a grill in which cooking progress can be observed without removing the covering lid thereby retaining heat and reducing cooking time.

SUMMARY OF THE INVENTION

The present invention is directed to overcoming one or more of the problems set forth above. Briefly summarized, according to one aspect of the present invention, an outdoor grill, comprises a housing having a central axis, a bottom, a first sidewall connected along a bottom edge of the first sidewall to the bottom on one side of the central axis forming a first corner with the bottom and defining a first sidewall opening, and a second sidewall connected along a bottom edge of the second sidewall to the bottom on the other side of the central axis forming a second corner with the bottom and defining a second sidewall opening. A firebox is positioned in the first corner and has a heat directing surface oriented at an angle to both the bottom and the first sidewall. A cooking rack has a cooking area and a handle extending through the first sidewall opening to position the cooking area of the rack over the firebox. The cooking rack adjusts to vary distance between the cooking area and the heat directing surface.

A second firebox positioned in the housing opposite the rack and first firebox speeds cooking by directing heat to the topside of the rack while the first firebox directs heat to the bottom side of the rack. The second firebox is vertically oriented and movable toward and from the cooking rack to vary heat intensity.

A covering lid for the housing has a window for viewing the cooking area of the rack so that cooking progress can be observed without interrupting the cooking. A light in the covering lid ensures sufficient illumination to view cooking progress without removing the covering lid.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 is a diagrammatic sectional view of a preferred embodiment of an outdoor grill according to the present invention.

FIG. 2 is a sectional view of the grill of FIG. 1 with legs detached for transport.

FIG. 3 is a plan view of the cooking rack of the grill of FIGS. 1 and 2.

FIG. 4 is a view of the handle portion of the cooking rack readied for engaging the rack.

FIG. 5 is a bag for storing and transporting the grill.

DETAILED DESCRIPTION OF THE PREFERRED EMBODIMENTS

Referring to FIGS. 1–2, an outdoor grill 10 is a quick and convenient tool for cooking food. The grill 10 has a housing 12 with a central axis 14, a bottom 16, a first sidewall 18 and a second sidewall 20. The first sidewall 18 defines a first sidewall opening and a vent 19 and is connected along its bottom edge to the bottom 16 on one side of the central axis forming a first corner with the bottom. The second sidewall 20 defines a second sidewall opening and a vent 21 and is connected along its bottom edge to the bottom 16 on the other side of the central axis 14 forming a second corner with the bottom.

A first firebox 22 is positioned in the first corner. It has a heat directing surface oriented at an angle to both the bottom 16 and the first sidewall 18. The firebox 22 preferably has a plurality of compartments for holding charcoal all of which can be used for large meals and only some of the used for small meals. The vents 19, 21 act as dampers for the firebox 22 by opening to create a draft to provide air to feed the fire and by closing to reduce air flow for the firebox. The vents 19, 21 permit smoke to escape in a controlled manner.

A screen 24 placed over the heat directing surfaces of the firebox compartments protects the food from ashes. The screen 24 and firebox 22 are releasably mounted so that they can be removed to empty ashes therefrom when cooking is completed. A stop member 26 fastened to the bottom 16 prevents horizontal movement of the first firebox 22. An adjustable clamping member 28 fastened to the first sidewall 18 prevents vertical movement of the firebox 22. The clamping member 28 may be a set screw or other device that can exert pressure on the firebox 22 to keep it from moving. The stop member 26 and clamping member 28 support and hold the screen 24 in position over the firebox 22.

Referring to FIGS. 1–4, a cooking basket or rack has a cooking compartment or area 30 and a handle 32 for positioning the rack over the firebox 22. The rack has upstanding loop handles 31L, 31R on the ends through which the handle 32 is inserted. The handle 32 is inserted by folding collapsible fingers 33L, 33R (FIG. 4) so that the fingers 33 may pass through the housing opening and loop handles 31. After insertion, the fingers 33 are extended so that the loop handles 31 are inboard of the fingers 33 and thereby retained on the handle 32.

The cooking area 30 is preferably a shallow basket with a cover 35. To concentrate heat and reduce cooking time, a plurality of metal or ceramic elements 37 are located on the bottom of the basket preferably out of contact with the food. The elements 37 and cover 35 cooperate to entrap and concentrate heat in the basket. Rising heat is prevented from escaping upward by the cover, when substantially free of openings, resulting in a more even and increased cooking temperature.

The handle 32 extends through the opening in the first sidewall 18 to position the cooking area 30 of the rack over the firebox 22. The handle 32 may be permanently attached to the cooking area 30 of the rack, but it is preferred that the handle detach and the opening through which it protrude be fitted with a cover to retain heat in the grill. The cooking rack is adjustable to vary the distance between the cooking area 30 and the heat directing surface of the firebox 22. Adjustability is achieved by using two stop members 34, 36. The first stop member 34 is fastened to the bottom 16 to prevent horizontal movement of the cooking rack and to position the cooking area 30 at a first preselected distance from the firebox 22. The second stop member 26 is fastened to the bottom 16 to prevent horizontal movement of the cooking rack and to position the cooking area at a second, greater preselected distance from the firebox.

To reduce cooking time, a second firebox 38 may be used. The second firebox 38 is positioned in the housing 12, opposite the first firebox 22, between the second sidewall 20 and the central axis 14. The second firebox 38 has a vertically oriented heat directing surface area whereby it directs heat to a top side of the cooking rack, which has an open cover to allow heat inside the basket, while the heat directing surface of the first firebox directs heat to a bottom side of the cooking rack. In this manner, both sides of any food on the cooking area of the rack is cooked on both sides simultaneously. The second firebox 38 preferably has a plurality of shelves 40 one above the other for holding charcoal or other fuel in a vertical alignment. The shelves are attached to a back plate that direct heat forward toward the cooking rack. A handle 42 is attached to the second firebox 38 and protrudes through the opening in the second sidewall for moving the second firebox toward and from the central axis. Preferably, a cover 43 is fitted about the handle 42 and secured with a screw to abut the housing to retain heat in the grill and prevent drafts that could interfere with cooking. A screen 44 covers the front surface area of the second firebox to protect the food from ashes. The second firebox 38 is preferably mounted on a roller that is positioned between the second firebox 38 and the bottom 16.

The grill 10 includes a housing cover 46 having a window 48 for viewing the cooking area of the rack when the cover rests on the first and second sidewalls. It preferably includes a battery powered lamp 50 for illuminating the cooking area of the rack when the cover rests on the first and second sidewalls. The window 48 and lamp 50 are preferably mounted on a sliding panel 49 that slides out for cleaning the glass in the window and glass cover for the lamp.

The housing 12 is supported by two pairs of legs, only one pair of which is shown, including hollow legs 52 and 54. Each leg has top, middle and bottom segments detachably connected to one another. Top segment 56 of leg 52 is fastened to the housing 12 and releasably connected to middle segment 58 which is releasably connected to bottom segment 60. Bottom segment 60 preferably has an adjustable foot 62 for stability on uneven terrain. Top segment 64 of leg 54 is fastened to the housing 12 and releasably connected to middle segment 66 which is releasably connected to bottom segment 68. Bottom segment 68 preferably has an adjustable foot 70 for stability on uneven terrain. Top segment 56 has an opening facing toward top segment 64 which has a similar opening facing toward top segment 56. The middle and bottom segments of the legs are detached from the top segments and stored one above the other by inserting them between the top segments in the openings. Alternatively, a shelf may extend between the top segments for storing the legs or for reducing the grill height for transport.

Referring to FIG. 5, a bag 72 receives the partially dismantled grill. The grill is easily transported or stored in the bag which has firmly attached handles for this purpose. The bag makes a neat package when transported in an automobile and the bag prevents the grill from soiling the automobile.

It can now be appreciated that an easily transported outdoor grill has been presented that heats food from two sides instead of only one to reduce cooking time. The grill has a housing containing a first firebox positioned in a corner along a sidewall and bottom of the housing. The heat directing surface of the first firebox is oriented at an angle to both the bottom and sidewall. A cooking rack is positionable over the firebox. The cooking rack adjusts to vary distance between the cooking area and the heat directing surface of the firebox. A second firebox is positioned in the housing opposite the rack and first firebox to speed cooking by directing heat to the topside of the rack while the first firebox directs heat to the bottom side of the rack. The second firebox is vertically oriented and movable toward and from the cooking rack to vary heat intensity. A covering lid for the housing has a window for viewing the cooking area of the rack so that cooking progress can be observed without interrupting the cooking. A battery operated light in the covering lid ensures sufficient illumination to view cooking progress without removing the covering lid.

Operation of the present invention is believed to be apparent from the foregoing description and drawings, but a few words will be added for emphasis. The grill is removed from the bag and is assembled by removing the legs from the storage area beneath the bottom of the grill. The loose segments of the legs are assembled and connected to the leg segments permanently attached to the housing. The feet are adjusted to level the grill on the terrain where it is used. The first firebox is loaded with fuel and ignited prior to installing the rack. If additional heat is required or to speed cooking, the second firebox is loaded with fuel, ignited and positioned as desired using the handle. Food is introduced to the rack and the cover is lowered into the closed position. Cooking progress is monitored by looking through the window. Where the firebox provide insufficient illumination to view cooking progress, the lamp is used to illuminate the food.

While the invention has been described with particular reference to the preferred embodiments, it will be understood by those skilled in the art that various changes may be made and equivalents may be substituted for elements of the preferred embodiments without departing from invention. In addition, many modifications may be made to adapt a particular situation and material to a teaching of the invention without departing from the essential teachings of the present invention. Certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. An outdoor grill, comprising:

a housing having a central axis, a bottom, a first sidewall connected along a bottom edge of said first sidewall to said bottom on one side of said central axis forming a first corner with said bottom and defining a first sidewall opening, and a second sidewall connected along a bottom edge of said second sidewall to said bottom on the other side of said central axis forming a second corner with said bottom and defining a second sidewall opening;

a first firebox positioned in said first corner having a first heat directing surface oriented at an angle to both said bottom and said first sidewall;

holding means for holding said first firebox in position;

a cooking rack having a cooking area and a handle, said handle extending through said first sidewall opening to position said cooking area over said first firebox; and adjusting means for adjusting said cooking rack to vary distance between said cooking area and said heat directing surface.

2. An outdoor grill, as set forth in claim 1, including a housing cover having a transparent area for viewing said cooking area of said rack when said cover rests on said first and second sidewalls.

3. An outdoor grill, as set forth in claim 1, including a housing cover having a lamp for illuminating said cooking area of said rack when said cover rests on said first and second sidewalls.

4. An outdoor grill, as set forth in claim 1, wherein said holding means includes a stop member fastened to said bottom to prevent horizontal movement of said first firebox.

5. An outdoor grill, as set forth in claim 1, wherein said holding means includes an adjustable clamping member fastened to said first sidewall to prevent vertical movement of said first firebox.

6. An outdoor grill, as set forth in claim 1, including a second firebox in said housing opposite said first firebox between said second sidewall and said central axis, said second firebox having a vertically oriented heat directed surface whereby said second heat directing surface directs heat to a top side of said cooking rack and said first heat directing surface directs heat to a bottom side of said cooking rack.

7. An outdoor grill, as set forth in claim 1, wherein said adjusting means includes a first stop member fastened to said bottom to prevent horizontal movement of said cooking rack and to position said cooking area at a first preselected distance from said heat directing surface.

8. An outdoor grill, as set forth in claim 7, including a second stop member fastened to said bottom to prevent horizontal movement of said cooking rack and to position said cooking area at a second preselected distance from said heat directing surface, said second preselected distance being greater than said first preselected distance.

9. An outdoor grill, as set forth in claim 8, including a handle attached to said second firebox for moving said second firebox toward and from said central axis.

10. An outdoor grill, as set forth in claim 8, including a screen covering a front surface area of said second firebox adjacent said central axis.

11. An outdoor grill, as set forth in claim 8, including a roller positioned between said second firebox and said bottom.

12. An outdoor grill, as set forth in claim 8, including a plurality of shelves positioned one above the other for holding fuel, said shelves being attached to a back plate that direct heat forward toward said cooking rack.

13. An outdoor grill, as set forth in claim 1, including a plurality of legs detachably connected to said housing.

14. An outdoor grill, comprising:

a housing having a central axis, a bottom, a first sidewall connected along a bottom edge of said first sidewall to said bottom on one side of said central axis forming a first corner with said bottom and defining a first sidewall opening, and a second sidewall connected along a bottom edge of said second sidewall to said bottom on the other side of said central axis forming a second corner with said bottom and defining a second sidewall opening;

a first firebox positioned in said first corner having a first heat directing surface oriented at an angle to both said bottom and said first sidewall;

holding means for holding said first firebox in position;

a cooking rack having a cooking area and a handle, said handle extending through said first sidewall opening to position said cooking area over said first firebox;

adjusting means for adjusting said cooking rack to vary distance between said cooking area and said heat directing surface;

a second firebox in said housing opposite said first firebox between said second sidewall and said central axis, said second firebox having a vertically oriented heat directed surface whereby said second heat directing surface directs heat to a top side of said cooking rack and said first heat directing surface directs heat to a bottom side of said cooking rack; and a housing cover having a window for viewing said cooking area of said rack and a lamp for illuminating said cooking area of said rack when said cover rests on said first and second sidewalls.

15. An outdoor grill, as set forth in claim 14, wherein said adjusting means includes a first stop member fastened to said bottom to prevent horizontal movement of said cooking rack and to position said cooking area at a first preselected distance from said heat directing surface.

16. An outdoor grill, as set forth in claim 15, including a second stop member fastened to said bottom to prevent horizontal movement of said cooking rack and to position said cooking area at a second preselected distance from said heat directing surface, said second preselected distance being greater than said first preselected distance.

17. An outdoor grill, as set forth in claim 14, including a screen covering a front surface area of said second firebox adjacent said central axis.

18. An outdoor grill, as set forth in claim 14, including a plurality of shelves positioned one above the other for holding fuel, said shelves being attached to a back plate that direct heat forward toward said cooking rack.

19. An outdoor grill, comprising:

a housing having a central axis, a bottom, a first sidewall connected along a bottom edge of said first sidewall to said bottom on one side of said central axis forming a first corner with said bottom and defining a first sidewall opening, and a second sidewall connected along a bottom edge of said second sidewall to said bottom on the other side of said central axis forming a second corner with said bottom and defining a second sidewall opening;

a first firebox positioned in said first corner having a first heat directing surface oriented at an angle to both said bottom and said first sidewall;

a first stop member fastened to said bottom to prevent horizontal movement of said first firebox;

an adjustable clamping member fastened to said first sidewall to prevent vertical movement of said first firebox;

a cooking rack having a cooking area and a handle, said handle extending through said first sidewall opening to position said cooking area over said first firebox; and a second stop member fastened to said bottom to prevent horizontal movement of said cooking rack and to position said cooking area at a first preselected distance from said heat directing surface;

a third stop member fastened to said bottom to prevent horizontal movement of said cooking rack and to position said cooking area at a second preselected distance from said heat directing surface, said second preselected distance being greater than said first preselected distance; and a second firebox in said housing opposite said first firebox between said second sidewall and said central axis, said second firebox having a vertically oriented heat directed surface whereby said second heat directing surface directs heat to a top side of said cooking rack and said first heat directing surface directs heat to a bottom side of said cooking rack.

20. An outdoor grill, as set forth in claim 19, including a plurality of shelves positioned one above the other for holding fuel, said shelves being attached to a back plate that direct heat forward toward said cooking rack.

* * * * *